Dec. 8, 1959 A. G. HOPPE ET AL 2,915,989
VEHICLE FOR HIGHWAY AND RAILWAY USE
Filed Dec. 13, 1954 9 Sheets-Sheet 4
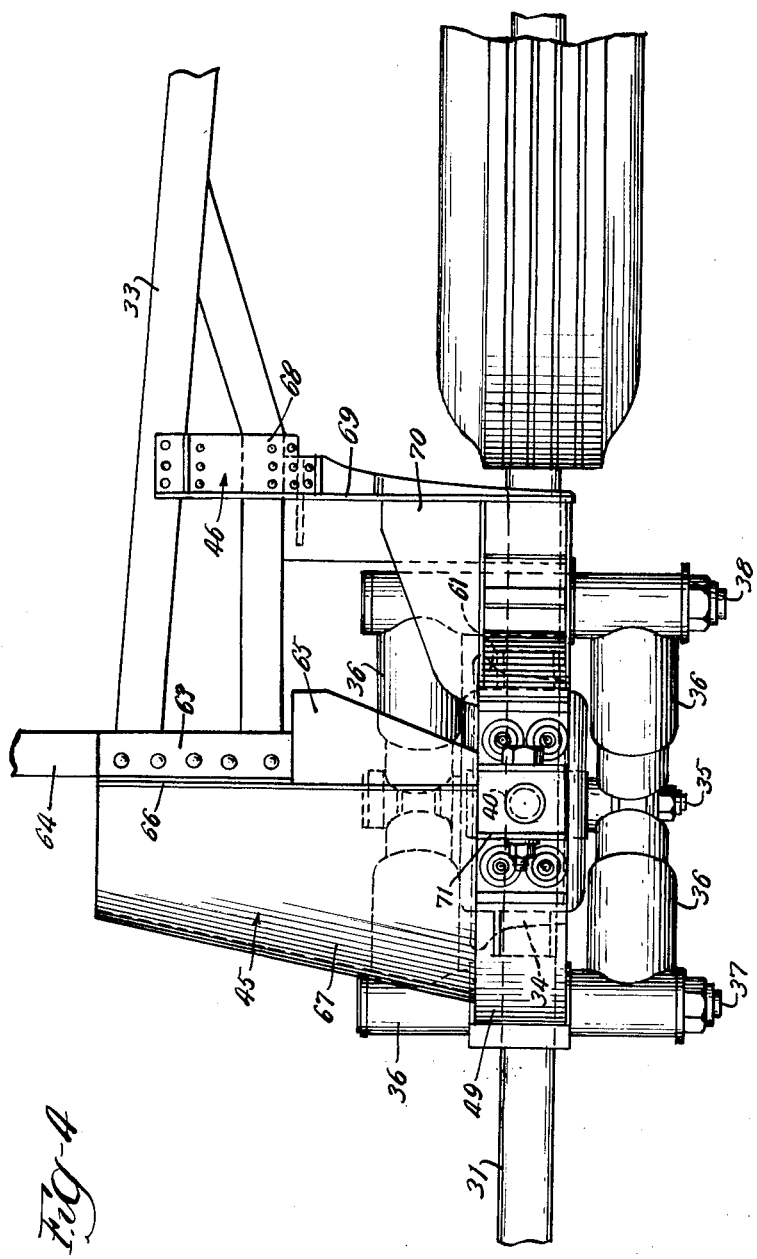
INVENTORS.
Alfred G. Hoppe &
Elmer F. Reinke
By:-
Mann, Brown and Hansmann
Attys.

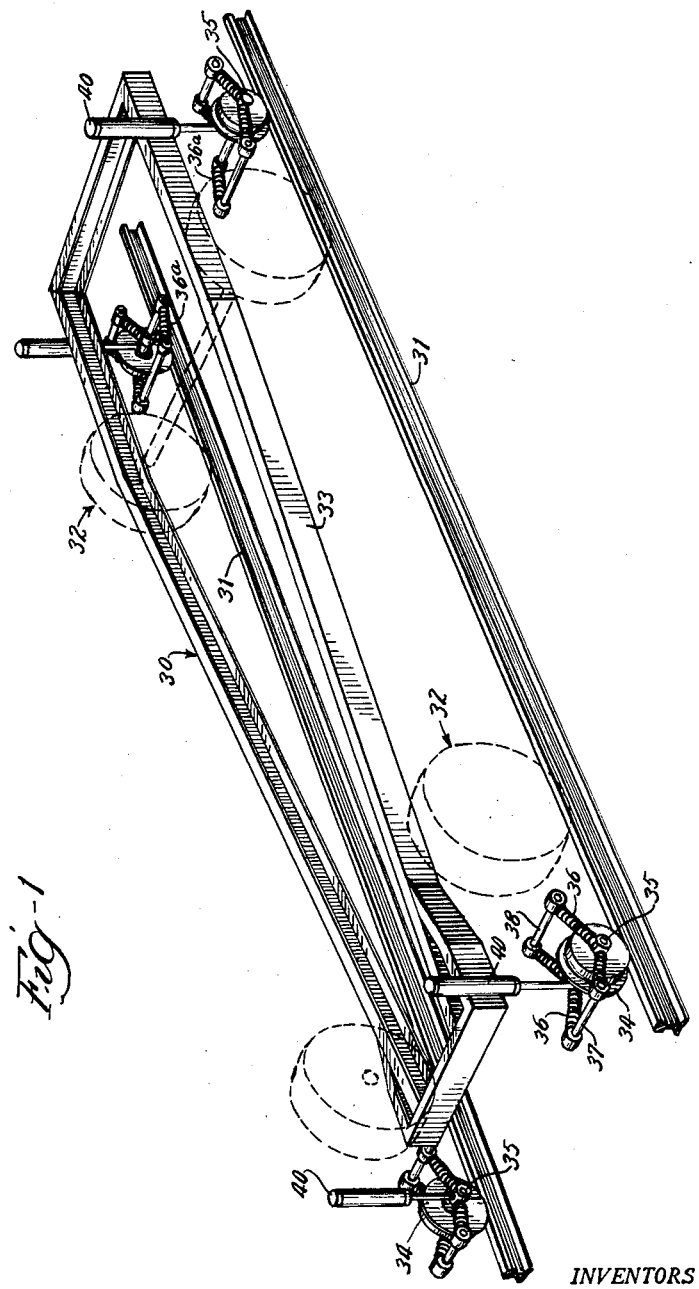

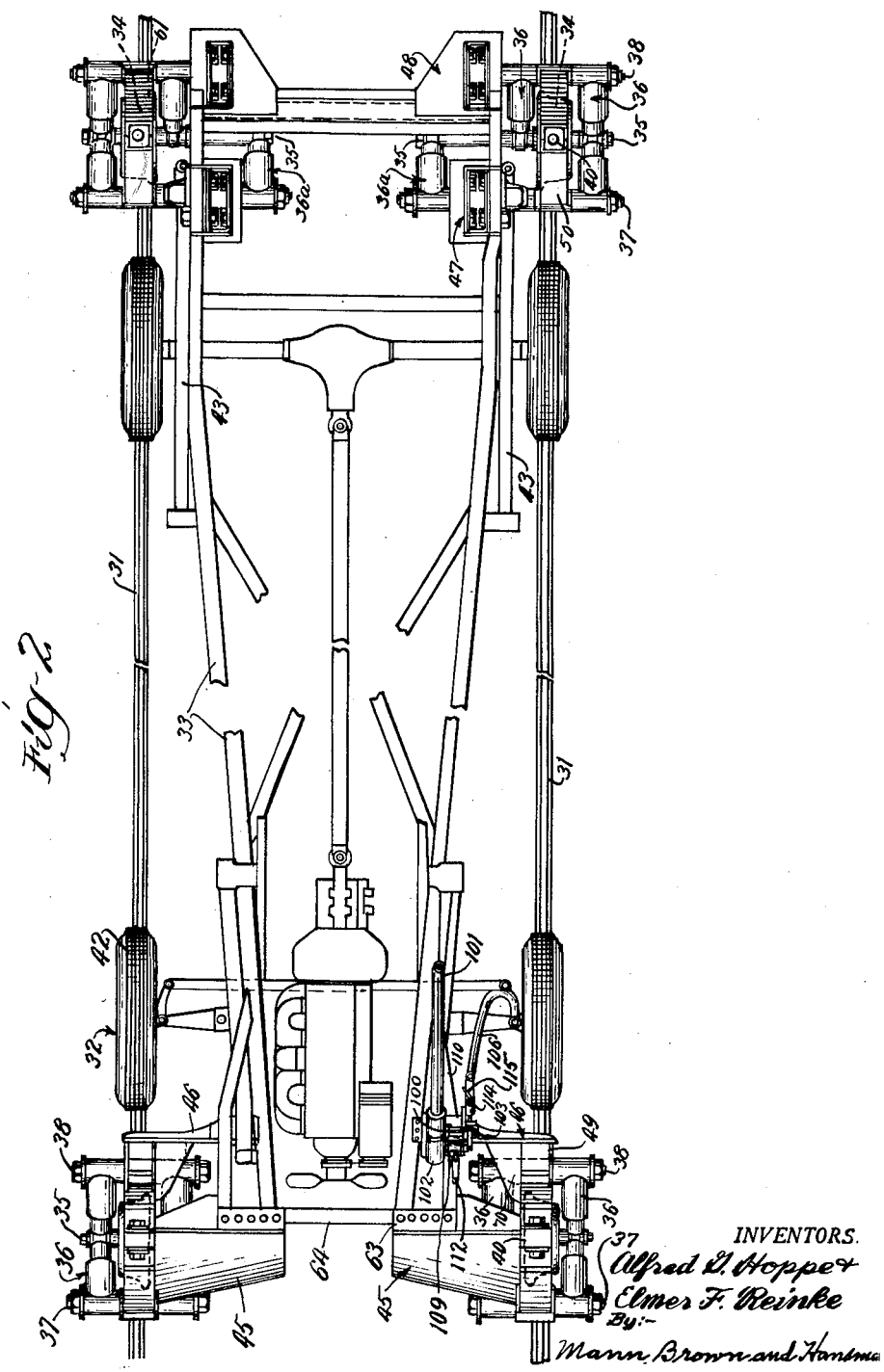

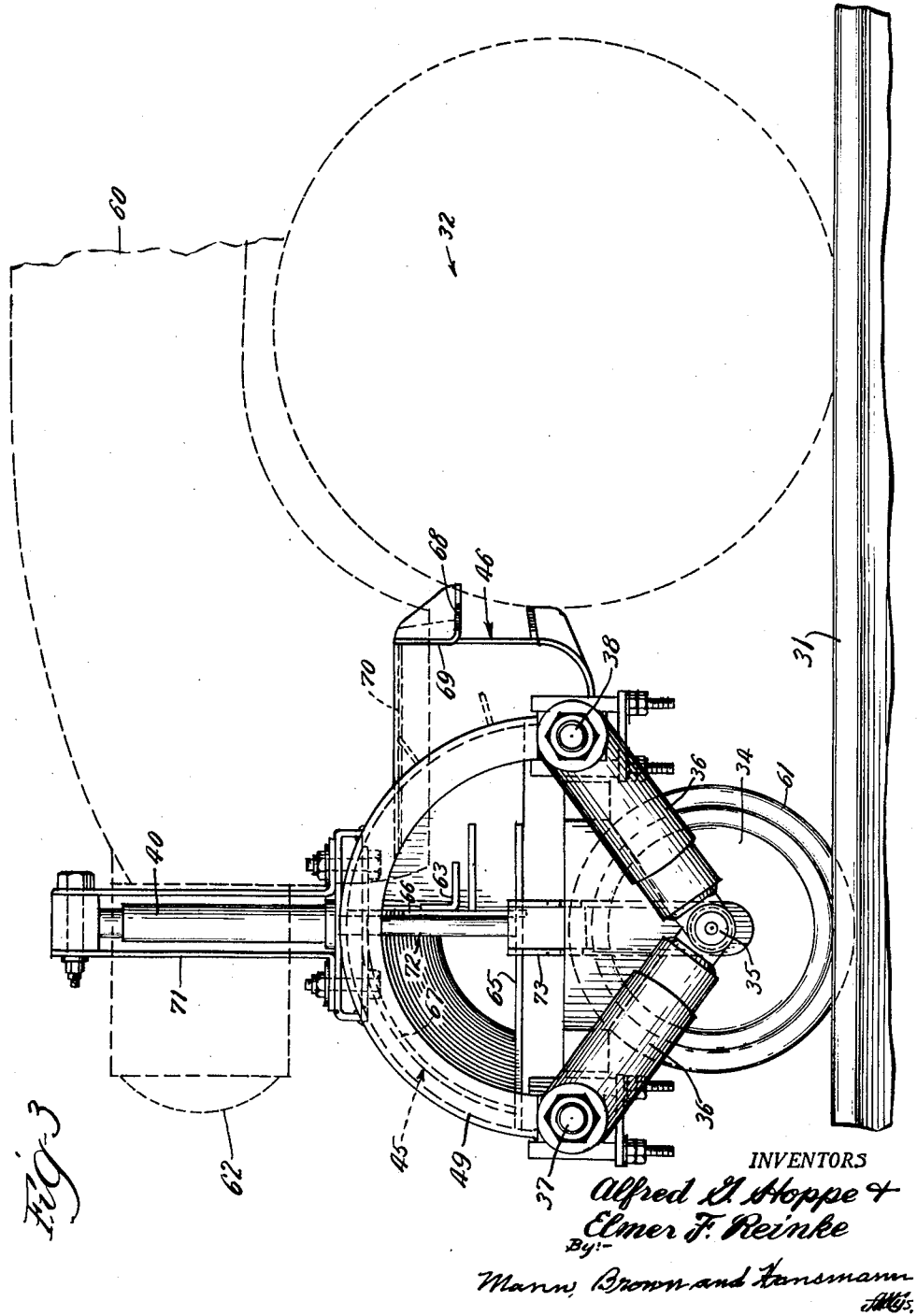

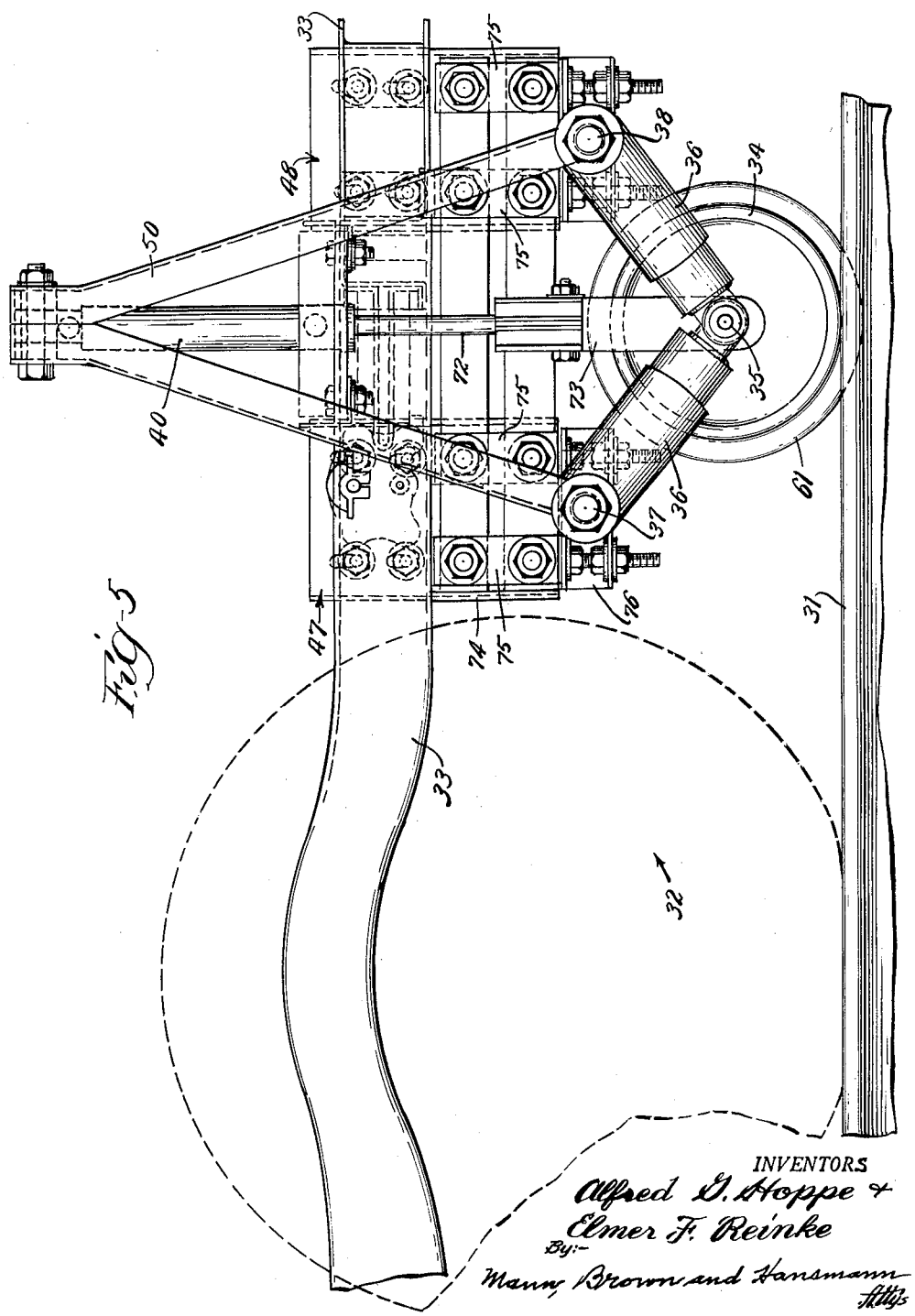

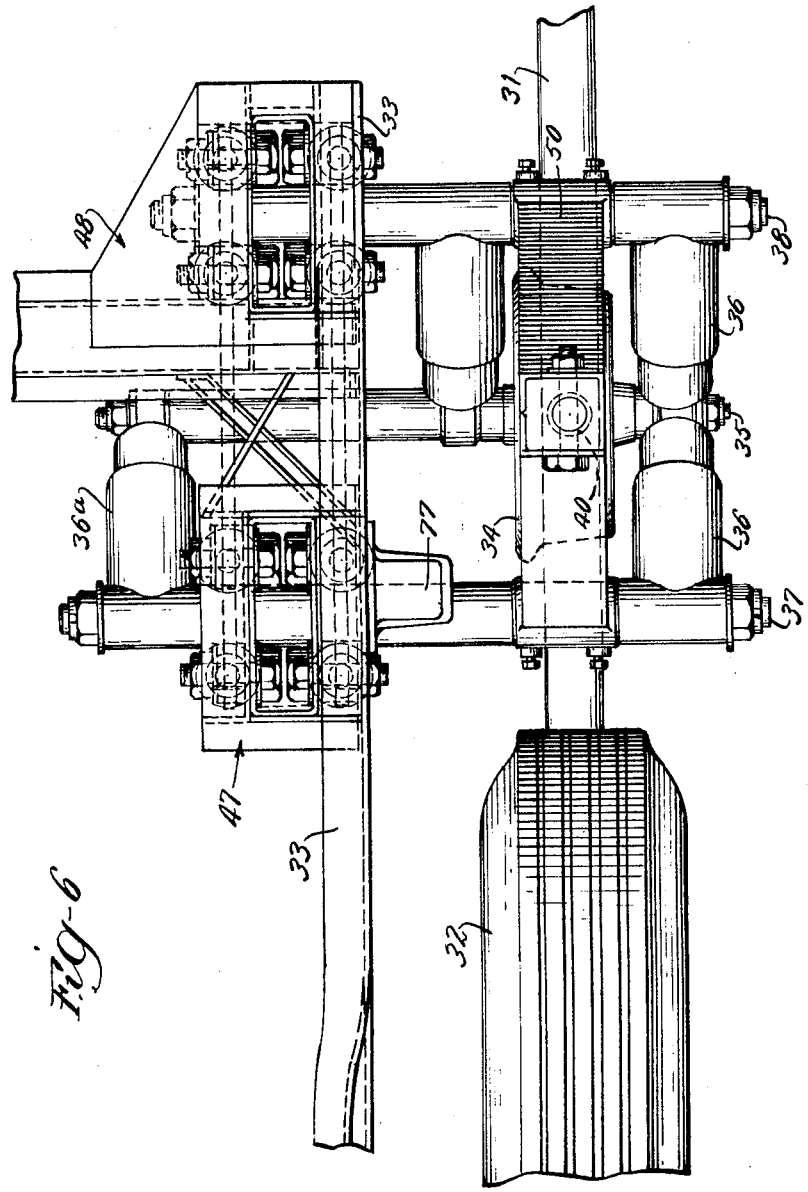

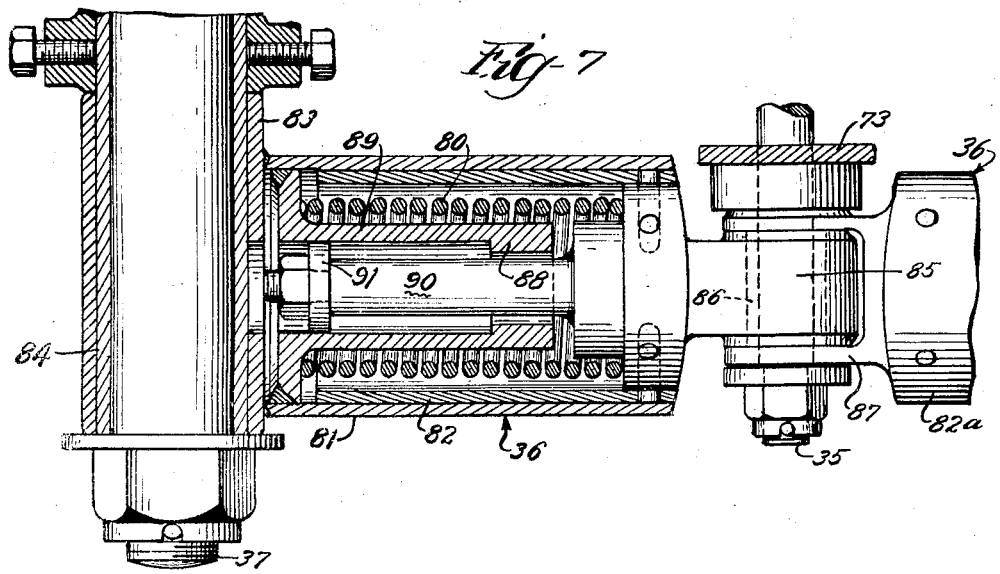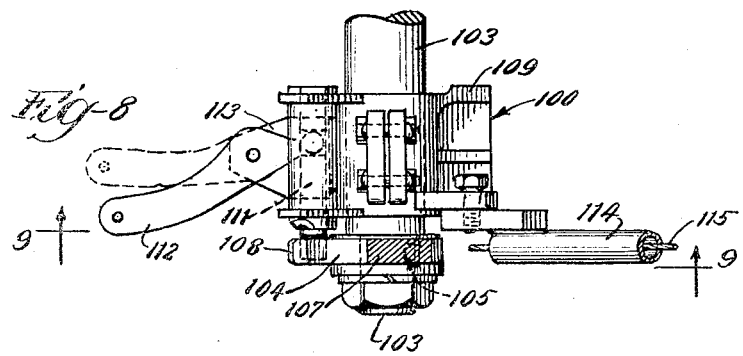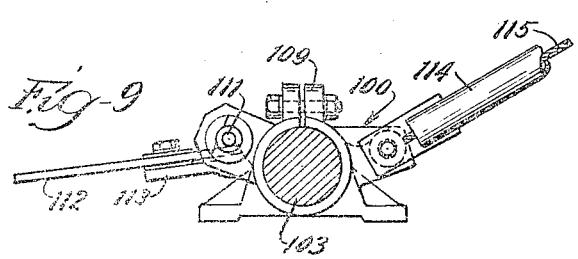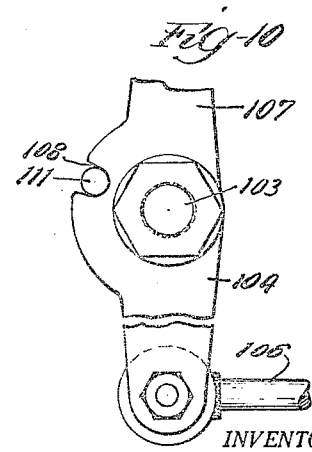
INVENTORS
Alfred G. Hoppe &
Elmer F. Reinke

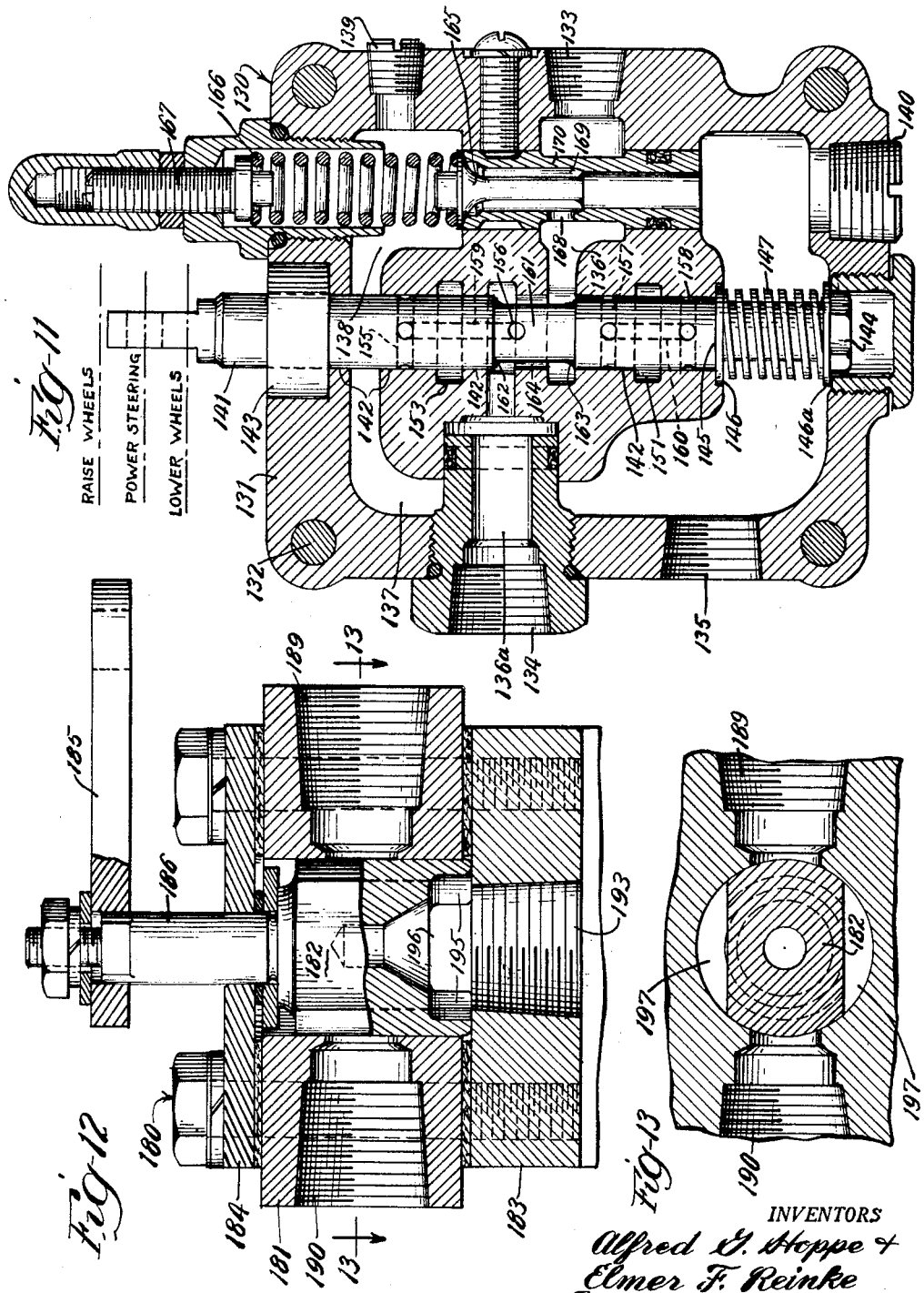

Dec. 8, 1959     A. G. HOPPE ET AL     2,915,989
VEHICLE FOR HIGHWAY AND RAILWAY USE
Filed Dec. 13, 1954     9 Sheets-Sheet 9
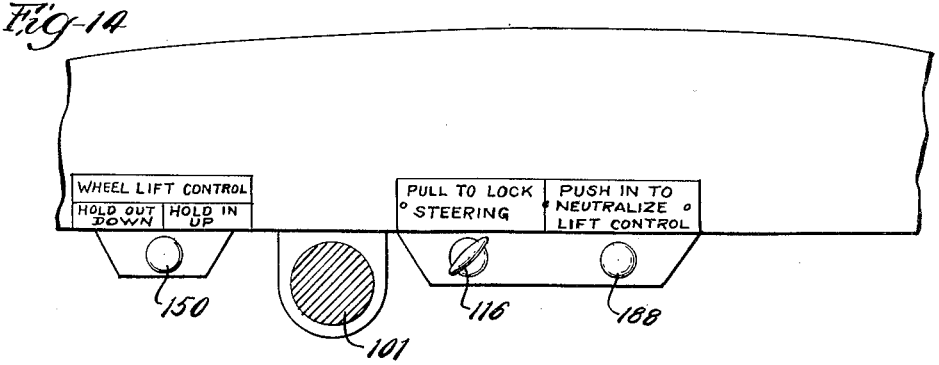
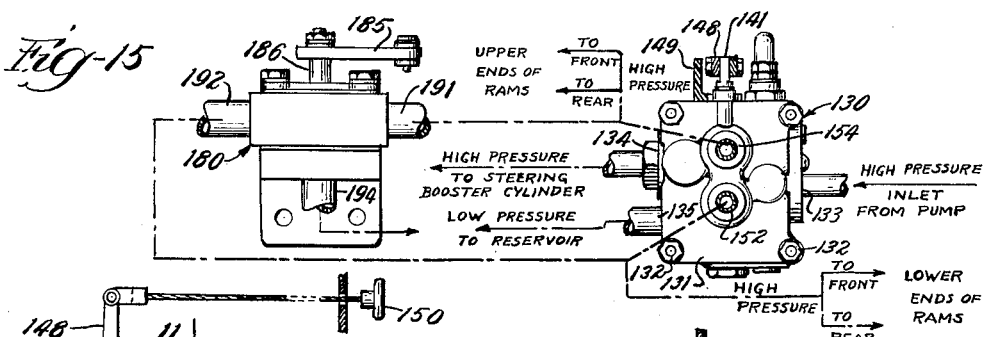
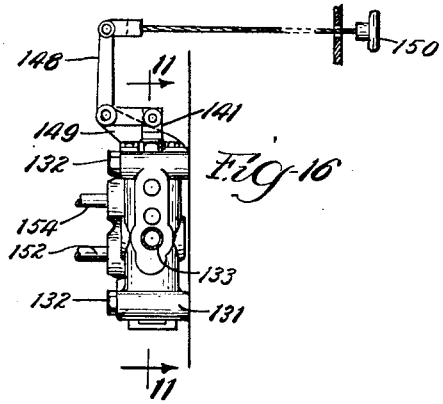
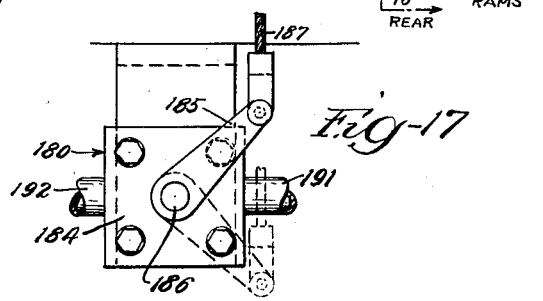
INVENTORS
Alfred G. Hoppe &
Elmer F. Reinke
By:—
Mann, Brown and Hansmann
Attys.

United States Patent Office 2,915,989
Patented Dec. 8, 1959

2,915,989

VEHICLE FOR HIGHWAY AND RAILWAY USE

Alfred G. Hoppe and Elmer F. Reinke, Milwaukee, Wis.

Application December 13, 1954, Serial No. 474,794

10 Claims. (Cl. 105—215)

This invention relates to a vehicle for use on either a highway or a railway, and more particularly to such a vehicle having, in addition to its main load bearing wheels, a set of guide wheels which may be raised off the ground during highway operation and lowered into contact with the tracks for railway operation.

Vehicles of this type depend for their successful operation on having their wheels for highway operation spaced at substantially the same distance apart as the width of conventional gauge railway tracks. This happens to be the case with most mass produced automobiles, trucks, and buses. Thus the present invention is useful with most motor vehicles presently in commercial production. It would of course also be useful with any other vehicle having wheels similarly spaced, regardless of the method of propulsion, type of body, etc.

A motor vehicle having its wheels spaced as just described can ride with its rubber tired wheels squarely on the rails, so long as the vehicle can be kept properly aligned upon the tracks. The alignment is usually accomplished by attaching to the vehicle flanged metal guide wheels—shaped something like the metal wheels of a railroad car but smaller in diameter—in positions where they are effective to keep the vehicle centered upon the tracks. The steering mechanism of the vehicle is ordinarily locked by one means or another with the front wheels directed straight ahead, and the guide wheels follow the course of the tracks to take the vehicle around whatever curves occur in the railroad.

*Disadvantages of existing vehicles.*—Guide wheels presently used for this aligning purpose are carried on extra axles, one at the front and one at the rear. Usually these extra axles are attached to the main front axle assembly and rear axle housing of the motor vehicle.

In certain known vehicles of this type, the extra axle is attached to the main axle assembly or housing through a rigid connection. This obviously results periodically in an additional burden on the guide wheel axle bearings when the guide wheels ride on the rails, for the distance between the main axles and the tracks inevitably decreases from time to time due to (1) extra compression of the bottom surface of the rubber tires caused by sudden bumps, extra loads, or the like, or (2) a more gradual deflation of the tires caused by loss of operating air pressure within the tires. Any such increase in the weight borne by the guide wheel bearings is very hard on the bearings, as they are designed to carry a smaller and more uniform load. The operating speed of the vehicle must therefore be reduced if the bearings are not to be worn out very quickly.

Another alternative used in a known vehicle of this type having the guide wheel axle rigidly attached to the main axle assembly or housing is to lower the guide wheels to within only a short distance from the top surface of the rails. The wheels are lowered far enough that the downwardly depending flange of each wheel will help to guide the motor vehicle on the tracks, but not far enough that there will be any weight borne by the guide wheels. It is obvious, however, that this kind of limited contact between the guide wheels and the railway tracks is not likely to be reliable at higher speeds, so the maximum safe speed is again sharply reduced.

Perhaps the most serious disadvantage to using a single axle attached to the main front axle assembly for carrying the front pair of guide wheels, and a similar guide wheel axle attached to the rear axle housing for the rear pair of guide wheels, has to do with the lateral instability of such an arrangement. This instability sharply limits the maximum speed at which it is safe to operate the vehicle on railway tracks.

Guide wheel axles attached to a main axle of the vehicle are customarily attached by an arrangement of parts which permits a certain amount of lateral movement. Thus the guide wheels cannot confine the main load bearing wheels of the vehicle against major lateral shifts when the center of gravity of the chassis frame shifts suddenly toward one side or the other as the vehicle is driven around curves or along bumpy track. Sudden lateral shifts of this kind may be so large that at higher speeds they cause the rubber tires of the main load bearing wheels to slide off the railway tracks.

On the other hand, the connection between the guide wheel axle and the main axle assembly or housing of the vehicle is rigid enough to cause difficulties because of higher frequency lateral vibrations which are produced in the main load bearing wheels. These lateral vibrations are transmitted through the main axles to the guide wheels, and there reduce further the reliability of the contact between the guide wheels and the rails.

Finally, among still other disadvantages, a single axle for the rear pair of guide wheels introduces serious problems of modification of the body and chassis structure of the vehicle when it is desired to add guide wheels to an ordinary mass produced automobile, bus or truck. For example, various components such as the rear springs, the gas tank, the gas tank hangers, and the muffler pipe must be relocated. The modifications that must be made as a result of this are tantamount in some cases to a virtual rebuilding of portions of the vehicle.

*Invention summarized.*—In the vehicle of the present invention, the four guide wheels are carried on four separate, individual axles, each of which is attached to the frame of the vehicle chassis through heavy spring means and elevating means. To prepare the vehicle for operation upon a railway, the main load bearing wheels are aligned upon the railway tracks and the elevating means are actuated to lower the guide wheels until they are in contact with the tracks. If the vehicle has a steering wheel this is then locked, with the wheels directed straight ahead. To prepare the vehicle for highway operation, the steps are reversed.

In the embodiment described in this specification, the elevating means are hydraulic rams. The vehicle is equipped with power steering, and each hydraulic ram is connected operatively to the hydraulic pressure system by which the steering mechanism is powered. A control knob is provided by which application of hydraulic pressure to the rams is readily controlled from the front seat of the vehicle. Locking of the steering wheel is accomplished by means of a relatively simple but strong, effective device which is also controlled readily from the front seat of the vehicle.

*Advantages of this invention.*—This arrangement avoids all the disadvantages of the prior art referred to above.

The guide wheels ride in firm contact with the rails at all times. The spring means by which each individual guide wheel axle is suspended from the chassis frame of the vehicle exerts a practically uniform predetermined downward force upon the guide wheel against the track. Because of the resiliency of the springs, in normal operation this force exerted on the guide wheels remains substantially uniform regardless of the load carried by the vehicle and regardless of any bouncing or any other up and down movement of the main axles. This means that there is no appreciable extra pressure, whether continuous or intermittent, to produce extra wear and shorten the useful life of the guide wheel bearings.

The connection between the guide wheels and the chassis frame permits practically no lateral play or movement of the frame with respect to these wheels. As a result, the vehicle chassis frame and body are confined by the guide wheels against any major sidewise shift of their center of gravity. This automatically confines the main load bearing wheels against any major lateral shifts, and keeps them in proper alignment on the rails.

With the guide wheel assembly of this invention, two important means are provided for confining the main load bearing wheels against lateral vibrations which are of higher frequency. As with major sidewise movement of the chassis frame and vehicle body, the guide wheels themselves help to oppose this vibration. In addition, vibration originating in the main wheels of the vehicle tends to be damped to a material extent by the inertia of the chassis frame and car body, and is thus largely dissipated in the chassis frame and body without being passed on to the guide wheels at all.

Because the guide wheel axles of this invention do not extend through the entire width of the vehicle, the amount of structural modification required to adapt a mass produced vehicle for addition of guide wheels is quite minor.

Because the hydraulic rams controlling the lowering and raising of the guide wheels are tied in with the hydraulic pressure system of the power steering, movement of the guide wheels from one position to another can be accomplished by the operator entirely automatically without his having to get out of the car to operate any kind of crank.

Similarly, the front wheels are locked in place for use on railway tracks by means located within easy reach on the dashboard and actuated by a simple push-pull wire.

All these advantages combine to provide a vehicle which may be operated safely and with great comfort at quite high speeds, and which may be quickly and easily prepared for change from highway use to railway use or back again.

The invention will be described in relation to the embodiment shown in the accompanying drawings.

In the drawings:

Figure 1 is a diagrammatic perspective view of one embodiment of this invention;

Figure 2 is a plan view of the same embodiment of this invention;

Figure 3 is a side elevation of the left front guide wheel assembly of the embodiment shown in Figure 2;

Figure 4 is a plan view of the left front guide wheel assembly of Figure 3;

Figure 5 is a side elevation of the left rear guide wheel assembly of the embodiment shown in Figure 2;

Figure 6 is a plan view of the left rear guide wheel assembly of Figure 5;

Figure 7 is a sectional view of the spring means connecting the guide wheel axle to the vehicle chassis frame;

Figure 8 is a plan view of the locking device for the steering wheel of the vehicle shown in Figure 2;

Figure 9 is a side elevation of the locking device of Figure 8 including a sectional view taken along line 9—9 in Figure 8;

Figure 10 is a fragmentary side elevation of the steering rod and attached lever arm in the steering mechanism of the vehicle shown in Figure 2;

Figure 11 is a sectional view of the hydraulic ram control valve of the vehicle shown in Figure 2;

Figure 12 is a sectional view of a device for neutralizing the hydraulic rams of the vehicle shown in Figure 2;

Figure 13 is a fragmentary sectional view taken along line 13—13 of Figure 12;

Figure 14 is a front elevation of the control panel employed with the embodiment of Figure 2 for controlling the hydraulic rams and locking the steering mechanism of the vehicle;

Figure 15 is a side elevation of the hydraulic ram control valve of Figure 11 and the hydraulic ram neutralizer of Figure 12 showing diagrammatically connections which lead to other parts of the hydraulic system;

Figure 16 is a side elevation of the hydraulic ram control valve shown in Figure 15; and Figure 17 is a plan view of the hydraulic ram neutralizer shown in Figure 15.

*Assembled vehicle shown diagrammatically.*—One embodiment of this invention is shown as an assembled vehicle in two different views in Figures 1 and 2. Figure 1 is a perspective view of the vehicle, with the major elements of the invention shown diagrammatically. Figure 2 is a plan view showing how the guide wheel assemblies are positioned with respect to the chassis frame of the vehicle.

As already stated, the vehicle of this invention may be used both on a highway and on any railway having conventional gauge tracks. In Figure 1, vehicle 30 rides upon railway tracks 31 which are separated by the conventional distance of about fifty-six inches for American wide gauge railway tracks. The tracks may have any other spacing desired, so long as (1) all the tracks on which the vehicle is to be used have rails separated by substantially the same predetermined distance, and (2) the main load bearing wheels of the vehicle have substantially the same spacing as the tracks.

Vehicle 30 has four main load bearing wheels 32 attached to chassis frame 33. In the ordinary mass produced truck or bus, these wheels carry pneumatic rubber tires for highway use.

Guide wheels 34 are provided to keep the vehicle in proper alignment on the railway tracks with main load bearing wheels 32 resting squarely upon rails 31. Each guide wheel is carried by an individual axle 35, and is connected to frame 33 (as explained below) near its associated main load bearing wheel.

Axles 35 are each carried by four spring means 36. These spring means are in turn rotatably attached to a forward trunnion 37 and a rear trunnion 38. Trunnions 37 and 38 are in turn attached firmly (by a connection which for simplification is not shown in Figure 1) to chassis frame 33.

Spring means 36a, associated with each rear guide wheel 34, is displaced inwardly a sufficient amount to provide clearance for the leaf type springs (not shown in Figure 1) of the vehicle.

Hydraulic rams 40 operate to raise and lower the respective guide wheel axles 35. Rams 40 are connected firmly (by means not shown in Figure 1) to trunnions 37 and 38, and through them to chassis frame 33.

Figure 1 shows guide wheels 34 in position for aligning vehicle 30 upon rails 31. Hydraulic rams 40 may be actuated to raise the guide wheels from the rails for operation of the vehicle upon the highway, and to lower the wheels quickly whenever it is again desired to operate the vehicle upon railway tracks.

In viewing the diagrammatic perspective representation given in Figure 1, it must be remembered that hydraulic rams 40 are firmly attached to trunnions 37 and 38, and these in turn are attached to chassis frame 33. With this in mind, it will be clearly seen from Figure 1 how the guide wheel assembly of this invention provides the many advantages referred to above—including firm, reliable contact between the guide wheels and rails, a minimum of lateral shift in main load bearing wheels 32, and a minimum of lateral vibration in guide wheels 34.

*Assembled vehicle in detail.*—The assembled vehicle is seen in more detail in the plan view given in Figure 2. In that figure, rubber tires 42 are carried by main load bearing wheels 32, which are in turn carried by chassis frame 33. The rubber tired wheels ride upon rails 31.

Guide wheels 34, seen in dotted line in this plan view, are carried by guide wheel axles 35. Forward trunnions 37 and rear trunnions 38 each carry two spring means 36. Each pair of spring means is rotatably attached at their upper ends to a trunnion and rotatably attached at their lower ends to a guide wheel axle 35. As shown, spring means 36a are both displaced inwardly an amount sufficient to provide clearance for rear leaf springs 43.

Each pair of trunnions 37 and 38 associated with a front guide wheel is securely attached to chassis frame 33 through connecting assemblies 45 and 46. Each pair associated with a rear guide wheel is securely attached to the chassis frame through connecting assemblies 47 and 48.

In turn, yoke frame 49 is securely attached to the trunnions associated with each front guide wheel, and A-frame 50 is securely attached to the trunnions associated with each rear guide wheel. These frames carry hydraulic rams 40 for raising and lowering guide wheels 34.

The detailed structure of the guide wheel assemblies of this vehicle will be better seen in Figures 3 through 7.

*Front guide wheel assembly.*—Figure 3 shows the left front guide wheel assembly of this invention in operative position with respect to the left front main load bearing wheel 32 and left front fender 60 (shown in dotted lines). Main wheel 32 and guide wheel 34 are shown in their positions of contact with railway track 31.

From Figures 2 and 3 it is seen that metal guide wheels 34 are shaped something like the wheels of a railway car but smaller in diameter. Each wheel has a radially extending flange 61 which engages the inner side of corresponding railway track 31.

Installation of the guide wheel assembly on a commercially produced automobile requires very little change in the body of the vehicle. Fender 60 is extended forward somewhat further than in the usual mass produced vehicle, and headlight 62 (shown in dotted lines in Figure 3) is moved forward slightly. Otherwise, the only changes are structural ones for support of the guide wheel assembly.

As shown in Figures 3 and 4, connecting assembly 45 is attached securely by flange 63 at its inner end to the front cross piece 64 of vehicle chassis frame 33. Assembly 45 includes horizontal panel 65, vertical panel 66 and curved cowling 67. This structure is securely attached at its outer end to front trunnion 37.

Connecting assembly 46 is also securely attached at its inner end to chassis frame 33. At its outer end it is securely attached to rear trunnion 38. Assembly 46 includes horizontal panel 68, vertical panel 69, and cowling 70.

Front trunnion 37 and rear trunnion 38 are firmly attached to the lower ends of yoke frame 49. As best seen in Figure 4, the trunnions extend laterally on either side of the yoke.

Ram support 71 is securely attached at the top of yoke frame 49 and extends upward from the yoke. Its top end is adapted to hold firmly one end of hydraulic ram 40. Piston rod 72 extends downward from the ram.

A pair of spring means 36 are rotatably attached at their upper ends to the innermost and outermost parts of trunnion 37, and a second pair of spring means is similarly attached to trunnion 38. The bottom ends of all four spring means are rotatably attached to guide wheel axle 35, shown in Figures 3 and 4 in its normal downwardly extended position.

Piston rod 72 terminates at its lower end in bracket 73. This bracket extends downwardly to be attached at its lower end to guide wheel axle 35. It is seen that actuation of hydraulic ram 40 will cause piston rod 72 and bracket 73 to be moved upward, thereby raising guide wheel axle 35. This takes guide wheel 34 from its position of contact with rail 31, and moves it into its raised position for operation of the vehicle on a highway.

*Rear guide wheel assembly.*—For convenience, the rear guide wheel assembly in the embodiment of Figure 2 is shown as being of a different type than that shown for the front guide wheel assembly. As will be seen from Figures 5 and 6, it is of somewhat sturdier construction, with no particular attention having been paid in its design to its appearance when installed, and it is therefore better adapted for use with a truck or heavy duty automobile than with a light passenger automobile.

Front trunnion 37 is securely attached through connecting assembly 47 to chassis frame 33. Assembly 47 includes vertical plate 74, brackets 75, and member 76. Trunnion 38 is securely attached to chassis frame 33 by a similar arrangement of parts comprising connecting assembly 48.

A-frame 50 is attached at its lower end to trunnions 37 and 38 and extends upward from them. At its upper end it supports the top end of hydraulic ram 40, from which piston rod 72 and bracket 73 extend downward.

Spring means 36 are rotatably attached at their upper ends to the outermost parts of trunnion 37 and to the outermost and innermost parts of trunnion 38. Spring means 36a is rotatably attached at its upper end to the innermost part of front trunnion 37, which extends inward beyond both chassis frame 33 and connecting assembly 47. This provides clearance space for the leaf spring of the vehicle, which is attached at post 77 carried by chassis frame 33.

Spring means 36 and 36a are rotatably attached at their lower ends to guide wheel axle 35. Bracket 73 is also attached at its lower end to axle 35.

*Guide wheel spring means.*—Figure 7 shows guide wheel spring means 36 in its raised, or fully compressed, condition. In this position guide wheel axle 35 has been raised to the same level as front trunnion 37. Operation of ram 40 has raised piston rod 72 and bracket 73, thereby raising the guide wheel axle.

Heavy coil spring 80 is contained within hollow piston 82 and slidably engaged outer cylinder 81. Cylinder 81 is rotatably attached at its upper end 83 to trunnion 37, with bearing 84 interposed between the two elements. Hollow piston 82 is rotatably attached at its bottom end through eye 85 to guide wheel axle 35, again with bearing 86 interposed between the elements.

Hollow piston 82a of the opposite spring means 36 is rotatably attached at its lower end to axle 35 by means of clevis 87 which straddles eye 85.

As hollow piston 82 slides within cylinder 81, its maximum outward movement is limited by stop 88, which is attached to cylinder 81. Stop 88 comprises one end of hollow cylinder 89, which is concentric with cylinder 81 and attached to the latter cylinder at the end opposite stop 88. Piston 90 is concentric with hollow piston 82 and is attached at one end to the latter member. Piston 90 extends from its point of attachment with piston 82 through stop 88 into the space within hollow concentric cylinder 89. Piston 90 carries flange 91 at its end opposite its attachment with piston 82, the flange being slidably engaged within hollow cylinder 89 to permit piston 90 to slide in and out.

In summary, the following members are nested within each other in the order indicated: piston 90 in the center, hollow cylinder 89, coil spring 80, hollow piston 82, and cylinder 81 on the outside. Piston 90 carries flange 91 and hollow cylinder 89 carries stop 88, which together prevent the piston from being withdrawn altogether from its nested position within hollow cylinder 89. Thus, when hollow piston 82 moves within outer cylinder 81 from the compressed position of spring means 36 (seen in Figure 7) into the extended position of the spring means (to the right in Figure 7), piston 90 moves with it until flange 91 is barred from further outward movement by stop 88. This stops further relative movement of outer cylinder 81 and hollow piston 82.

When guide wheels 34 are in their normal operative contact with the railway tracks, hollow piston 82 is not yet extended to the full distance possible within outer cylinder 81. Nor is coil spring 80 extended to its full normal length or "free height." In one embodiment of the vehicle of this invention, spring 80 measures about 5" long in its compressed condition shown in Figure 7, and about 14" in normal length, i.e., when under no compression. This spring measures about 12" when the guide wheels are in their normal operative contact with the railway tracks.

Extended to the latter length, coil spring 80 is still under compression, and so will exert a downward force upon guide wheel axle 35. This downward force helps to maintain a reliable contact between guide wheels 34 and the rails, and also provides resilience for supporting the extra weight added to the chassis frame by the attachment of the guide wheel assembly.

*Steering wheel locking device.*—Figures 8, 9 and 10 show steering wheel locking device 100 which keeps the front wheels of the vehicle of this invention directed straight forward whenever the vehicle is being operated on railway tracks. The locking device is seen in Figure 2 mounted upon the vehicle shown there.

In Figure 2, steering wheel post 101 is broken away at its top end and terminates at its lower end in steering gear 102. Steering gear 102 is of conventional construction including a worm gear driving a pinion (neither element being shown) which is mounted on the inner end of rotatable shaft 103. Shaft 103 rotates in one direction or the other depending on the direction in which the steering wheel is turned.

The outer end of the shaft carries steering lever arm 104, which is locked to the shaft by key 105 so that the steering arm rotates whenever any turning of the steering wheel causes shaft 103 to rotate. Arm 104 is in turn rotatably attached to rod 106, which as best seen in Figure 2 controls the turning of the front wheels of the vehicle. Upper end 107 of steering arm 104, broken away in the view given in both Figures 8 and 10, is rotatably attached to the piston of the booster cylinder (not shown) of the power steering apparatus.

The hub of arm 104 contains slot 108. Bracket 109 of locking device 100 is attached by conventional means to member 110 (not shown in Figures 8 or 9) of chassis frame 33. Bracket 109 carries locking pin 111, which is slidably engaged in a cylinder carried by lugs extending from the bracket in such a position that the outer end of the locking pin is in alignment with the position occupied by slot 108 when the front wheels of the vehicle are pointed straight ahead. It is seen that when pin 111 slides out of its retracted position into engagement with slot 108, steering arm 104 is immediately locked so that no movement will be permitted of steering rod 106. As a consequence, the front wheels of the vehicle will be held directed straight forward and can not turn either to the right or to the left.

Locking pin 111 is caused to move outward and inward by steering lock lever 112. Lever 112 is supported by and rotates about support bracket 113 as a fulcrum. In the position shown in solid lines in Figure 8, the lever holds locking pin 111 in its retracted or inner position. When lever 112 is moved into the position shown in dotted lines in Figure 8, it forces locking pin 111 into its extended or outward position, also in dotted lines in Figure 8.

Conduit 114 is attached to mounting bracket 109 at its lower end and terminates at its upper end at the dashboard of the vehicle. Control rod 115, terminating at its upper end in control knob 116 (seen in Figure 14), is housed in conduit 114. The lower end of rod 115 is attached to steering lock lever 112 through a suitable connection (not shown) which causes the lever to force locking pin 111 into engagement with slot 108 whenever control knob 116 is pulled away from the dashboard. When knob 116 is pushed in again, control rod 115 forces lever arm 112 to retract pin 111 to its unlocked position.

*Hydraulic ram control valve.*—Figure 11 is a sectional view of hydraulic ram control valve 130, by means of which the operator of the vehicle shown in Figure 2 may cause hydraulic rams 40 to raise or lower guide wheels 34. In addition, when the vehicle is in condition for highway use, the operator may employ control valve 130 to cut the hydraulic rams out of the hydraulic pressure system of the vehicle, and to produce an operative connection between the hydraulic pressure source and the power steering apparatus of the vehicle.

Valve 130 includes valve body 131, which is shown in Figure 11 as being of integral construction, having been machined from a solid piece of metal. Bolts 132, at the four corners of the body, are for mounting the valve in its operative position. Valve body 131 may be of laminated construction if desired, with two halves being cast separately and joined by bolts 132 with a suitable gasket pressed tightly between them. Bolts 132 then serve both an assembly and a mounting function.

High pressure inlet 133 is connected operatively with the hydraulic pump (not shown) of the power steering system of the vehicle. Outlet 134 leads to the booster cylinder (not shown) of the power steering apparatus. Outlet 135 provides a return low pressure line to the oil reservoir (not shown) of the hydraulic pressure system. The inlet and outlets are seen in side elevation in Figure 15.

Returning to Figure 11, valve 130 is seen to include internal passageways 136 and 136a which communicate between inlet 133 and outlet 134. It also includes internal passageway 137 which communicates between safety valve chamber 138 and low pressure return outlet 135.

Inspection and cleaning ports in the valve body are located in the general vicinity of safety valve chamber 138 and low pressure return outlet 135, respectively, and are closed with threaded plugs 139 and 140.

Valve plunger 141 is slidably confined in suitable channels 142 in the valve body. At its upper end, plunger 141 is seated in sealing ring 143. At its lower end, the plunger terminates in bolt 144.

The shaft of the bolt is of smaller diameter than is the rest of plunger 141, so that shoulder 145 is formed at the point where the bolt joins the bottom end of the plunger. The head of the bolt provides an opposing surface facing this shoulder. Washer 146 is carried by the bolt immediately against the shoulder, and washer 146a immediately against the head of bolt 144. Washer 146a is restricted in downward movement by the wall of the valve body, while bolt 144 is permitted to move into a recess in the wall whenever plunger 141 is moved downward. Between them, washers 146 and 146a confine spring 147. It is seen that whenever plunger 141 is moved in either direction from its neutral position as shown in Figure 11, spring 147 urges the plunger to return to that neutral position.

Plunger 141 is moved from its neutral position by knee shaped lever arm 148, best seen in Figure 16. Arm 148 pivots about the fulcrum provided by bracket 149, which is attached to the top of hydraulic ram control valve 130. As seen in Figures 15 and 16, arm 148 is rotatably attached to the upper end of plunger 141. As guide wheel lift control knob 150 (seen in Figures 14 and 16) is moved in or out, plunger 141 is moved up or down, respectively.

High pressure outlet chamber 151 in the valve body is seen in Figure 11. It is connected through conduit 152, as shown in Figures 15 and 16, to front and rear hydraulic rams 40. Conduit 152 leads to the bottom input connection of the rams, so that hydraulic pressure through this conduit will tend to force ram piston 72 upward.

Similarly, high pressure outlet chamber 153 is connected through conduit 154 to the upper input of rams 40. Application of pressure from chamber 153 to the hydraulic rams thus tends to force piston 72 to move downward.

Plunger 141 contains a network of internal passageways which in the upper and lower positions of the plunger shown in Figure 11 provide fluid communication between high pressure inlet 133 and high pressure outlet chambers 151 and 153, respectively. Horizontal channels 155 and 156 pass through plunger 141 in its upper portion. Horizontal channels 157 and 158 pass through plunger 141 in its lower portion. Channels 155 and 156 are connected by vertical channel 159. Channels 157 and 158 are connected by vertical channel 160.

The portion of plunger 141 lying generally within passageways 136 and 136a when the plunger is in its neutral position forms shank portion 161. Shank portion 161 has a narrower diameter than the rest of the plunger above and below that portion. Shoulder 162 is formed at the juncture of shank 161 and the upper portion of the plunger, and shoulder 163 is formed at the juncture of shank 161 and the lower portion of the plunger. The walls of passageways 136 and 136a and the outer surface of shank portion 161 form annular space 164, which provides communication between passageways 136 and 136a whenever plunger 141 is in the position shown in Figure 11. It should be noted that horizontal passageway 156 passes through the shank portion of plunger 141, rather than through the larger diameter part of the plunger.

Valve 165 is a safety valve which provides an alternative path between high pressure inlet 133 and low pressure outlet 135. Coil spring 166 and set screw 167 provide means by which the compressive force exerted upon valve 165 may be adjusted. Passageway 136 communicates through port 168 with annular space 169 between valve 165 and valve housing 170. When the hydraulic pressure within annular space 169 reaches a magnitude great enough to force spring 166 to be further compressed, valve 165 is forced open and some of the hydraulic fluid is bled off into safety valve chamber 138, from there through passageway 137 to low pressure outlet 135, and from there back to the oil reservoir.

*Operation of hydraulic ram control valve to raise guide wheels.*—The operation of hydraulic ram control valve 130 can best be seen from Figure 11. In that figure, the various passageways, channels and ports just described are all assumed to be completely filled with oil or other fluid used in the hydraulic pressure system.

When plunger 141 is in the neutral position shown in Figure 11, hydraulic pressure applied at inlet 133 is transmitted through passageway 136, annular space 164, and passageway 136a to outlet 134. From here the pressure is transmitted to the power steering apparatus of the vehicle.

As indicated by the legend on the control panel shown in Figure 14, pushing in control knob 150 causes hydraulic rams 40 to raise their associated guide wheels, and pulling the knob out causes the rams to lower the guide wheels. Figure 16 shows that plunger 141 is raised when knob 150 is pushed in, and is lowered by pulling the knob out. From Figure 11 it can be seen (as explained more fully below) that with plunger 141 in its upper position hydraulic pressure is applied at outlet chamber 151, and this in turn is connected with the lower end of the pressure cylinder of the hydraulic rams. This pressure tends to cause the guide wheels to be raised by the rams. The reverse is true when plunger 141 is moved into the lower position shown in Figure 11.

Considering Figure 11 in more detail, it is seen that when plunger 141 is moved upward by the distance indicated at the top of Figure 11, shoulder 163 closes off annular space 164. This removes from outlet 134 the hydraulic pressure applied at inlet 133.

At the same time, shoulder 162 moves up far enough that fluid communication is established between pressure outlet chamber 153, passageway 136a and outlet 134. In effect, annular space 164 is displaced upward sufficiently to provide a communication path around shank 161 of the plunger. Two results follow from this:

First, outlet 134 is connected through passageway 136a, the annular space about shank 161, and channels 156, 159 and 155 with passageway 137, which leads to low pressure outlet 135. From there a conduit leads back to the oil reservoir of the system. This renders the power steering apparatus of the vehicle inoperative.

Second, communication between the upper end of hydraulic rams 40 and low pressure outlet 135 is established through conduit 154 (shown in Figure 15), outlet chamber 153, the annular space about shank 161, channels 156, 159 and 155, and passageway 137. This permits guide wheels 34 to be raised when hydraulic pressure is applied at the lower end of the rams.

Movement of plunger 141 upward to the position indicated at the top of Figure 11 also brings channel 157 in communication with passageway 136, and channel 158 in communication with pressure outlet chamber 151. This causes the high pressure applied at inlet 133 to be transmitted to outlet 151, and from there through conduit 152 (shown in Figure 15) to the lower ends of hydraulic rams 40, thereby raising guide wheels 34.

When knob 150 is no longer held in but is released, it will return to its neutral position as spring 147 urges washer 146a, bolt 144, and plunger 141 downward to their positions shown in Figure 11. As a result, pressure outlet chamber 151 is cut off from high pressure inlet 133, and hydraulic pressure is again applied through outlet 134 to the hydraulic steering apparatus of the vehicle.

At this juncture the hydraulic pressure applied at the bottom end of the hydraulic rams from pressure outlet chamber 151 may if desired be left operative, as return of the bottom end of plunger 141 to the position shown in Figure 11 will effectively plug chamber 151 (at least for a period of time) against loss of fluid pressure. However, by means of the hydraulic ram neutralizer which is described below, the high pressure on the lower end of the rams may be removed if this is desired.

*Operation of hydraulic ram control valve to lower guide wheels.*—If control knob 150 is pulled out and held in that position, it is seen from Figure 16 that plunger 141 will be pushed downward to the lower position which is shown at the top of Figure 11.

In this position of the plunger, shoulder 162 operates to block annular space 164 just as shoulder 163 did when the plunger was raised. This again cuts off high pressure inlet 133 from outlet 134, rendering the power steering apparatus inoperative.

In this position of plunger 141, pressure inlet 133 is in communication with pressure outlet chamber 153 through channels 156, 159 and 155. From outlet chamber 153 the pressure is communicated through conduit 154 to the upper end of hydraulic rams 40, where it tends to push the associated guide wheels downward.

At the same time, the lower ends of the hydraulic rams are connected with low pressure outlet 135 through conduit 152 (shown in Figure 15), outlet chamber 151, and channels 157, 160 and 158. This permits the pressure applied at the top end of the rams to lower guide wheels 34 into contact with the railway tracks.

When control knob 150 is no longer held out but is released, it will move back to its neutral position as spring 147 pushes washer 146 and plunger 141 back up into the positions they occupy in Figure 11. This reconnects the power steering apparatus to the hydraulic pump by unblocking annular space 164. It also disconnects high pressure inlet 133 from outlet chamber 153.

At this juncture the hydraulic pressure applied to the upper ends of the rams will generally be released by operation of the hydraulic ram neutralizer which is now to be described.

*Hydraulic ram neutralizer.*—Figure 12 is a sectional view of hydraulic ram neutralizer 180. As shown in Figure 15, the neutralizer is connected between the upper ends of hydraulic rams 40 and the low pressure reservoir of the hydraulic system, and also between the lower ends of the rams and the reservoir.

Hydraulic ram neutralizer 180 is comprised of valve body 181 and valve 182 seated therein. Cover 183 and cover plate 184, with their associated gaskets, enclose valve body 181 on either side. Rotation of lever arm 185, attached to shank 186 of valve 182, moves the valve from its closed to its open position. The assembled neutralizer is best seen in Figure 15, with connections shown diagrammatically to hydraulic ram control valve 130.

Figure 17 shows how movement of arm 185 through 90° by means of rod 187 causes valve 182 to move from its closed to its open position. The open position of arm 185 is shown in dotted line in Figure 17. Rod 187 terminates in control knob 188, shown in Figure 14.

High pressure inlets 189 and 190 in valve body 181 are threaded to receive conduits 191 and 192 (seen in Figures 15 and 17), respectively. Conduit 191 is connected with the upper ends of hydraulic rams 40. Conduit 192 is connected with the lower ends of the hydraulic rams. Low pressure outlet 193 in cover 183 is threaded to receive conduit 194 (seen in Figure 15) which leads to the low pressure fluid reservoir of the hydraulic system.

Valve 182 is shown partly in section in Figure 12, and in plan view in Figure 13. It is spider-shaped, with depending feet 195 flanking opening 196 which passes entirely through the valve from side wall to side wall. From Figures 12 and 13 together, it is seen that in horizontal cross-section the valve presents a circular shape with flattened sides forming the opposing walls which are joined by opening 196.

When in its closed position, valve 182 seals high pressure inlet ports 189 and 190, as the cylindrical walls of the valve close off the inner ends of those ports. This prevents any communication between inlets 189 and 190 on the one hand, and outlet 193 on the other.

However, when control knob 188 is pushed in, arm 185 moves to the dotted line position shown in Figure 17 and valve 182 is rotated 90° from its position shown in Figure 13. It is seen that spaces 197 formed between the flat sides of valve 182 and the cylindrical walls of valve body 181 will also be moved through an arc of 90° into positions in which fluid communication is provided from both inlet 189 and inlet 190 to space 196 at the bottom of valve 182. This puts inlets 189 and 190 in communication with outlet port 193, and immediately removes any hydraulic pressure applied to the upper or lower end, respectively, of hydraulic rams 40.

*Purpose of neutralizer.*—As already mentioned above, when hydraulic ram control valve 130 cuts high pressure inlet 133 off from the hydraulic rams by return of plunger 141 to its middle or neutral position, hydraulic pressure remains in conduit 152 or 154, as the case may be. Depending upon the tightness of the fit between plunger 141 and the walls of channel 142, this pressure may continue substantially undiminished for some time unless it is removed by other means. Neutralizer 180 is the device which is used for this purpose.

High pressure on the upper end of the rams is neutralized by use of this device when the guide wheels have been moved down into operative contact with the railway tracks, so that coil springs 36 will be the sole connection between chassis frame 33 and guide wheel axles 35. This removes the substantially incompressible hydraulic connection between the chassis frame and the guide wheel axles and substitutes the resiliency of the springs, thus producing a practically uniform downward force upon the guide wheels against the rails.

In addition, it connects the upper end of hydraulic rams 40 with the oil reservoir of the hydraulic system—which is vented to the atmosphere—rather than with a closed system plugged by the tight fit of plunger 141 and channel 142. As a result, each guide wheel axle 35 is free, under the urging of springs 36, to move downward in response to low points in the rails, at least until all the slack in the movement of piston 72 of hydraulic ram 40 has been used up.

In one embodiment of this invention, piston 72 has a 9½" maximum stroke within the cylinders of the hydraulic rams, and when guide wheels 34 are in their normal position of contact with the rails approximately 7½" of this stroke has been used up. This leaves a distance of about two inches through which springs 36 can further extend themselves to force guide wheel axle 35 down below the position it normally occupies for railway use. It is seen from Figures 3 and 5 that guide wheels 34 will maintain snug contact with rails 31 even if the guide wheels are forced to drop as much as two inches in order to maintain contact, either before the front main load bearing wheel 32 passes over a sharp drop in the tracks or after the rear main load bearing wheel 32 has passed over a sharp rise in the tracks. This further increases the reliability of the contact between the guide wheels and railway tracks.

After the vehicle of this invention has been put into operation upon the rails, a situation may arise in which it is again desired to apply a downward hydraulic pressure to guide wheels 34. For example, the operator of the vehicle may find that material is packed along the inner edge of the tracks which should be removed to provide a safer contact in the future between the guide wheels and the tracks when the vehicle is again driven over this particular strip of track. In the usual case, neutralizer 180 will have already been closed by returning neutralizer control knob 188 to its original position immediately after guide wheels 34 have been placed in operative contact with the railway tracks. This closing of neutralizer 180 will permit application of hydraulic pressure to the guide wheels again, this time to force them to be extended by the hydraulic rams the maximum distance possible.

In the case of the embodiment referred to above, this would mean an additional two inch extension of plunger 72. The weight of the vehicle will then be borne in large part by trunnions 37 and 38, yoke frames 49, A-frames 50, and hydraulic rams 40. This greatly increases the downward pressure exerted by guide wheels 34, so that running the vehicle slowly over the track will cause flanges 61 of guide wheels 34 to clean the track out by forcing the packed material away from the inner edge of the rails.

To prepare the vehicle of this invention for leaving the railway tracks and use upon the highway, guide wheels 34 are raised into their elevated positions by means of hydraulic rams 40. At this juncture, if desired the closed high pressure hydraulic system pressing plungers 69 upward may be connected with the low pressure reservoir through neutralizer 180 and, for reasons explained more fully below, the guide wheels will still be reliably maintained in their elevated positions.

In one embodiment of this invention, coil spring 80 exerts a force of approximately 600 pounds as it tends to expand from its position of compression shown in Figure 7. This of course presses upper end 83 of outer cylinder 81 tightly against bearing 84 and trunnion 37. At the same time, it presses eye 85 of piston 82 tightly against bearing 86 and guide wheel axle 35. The frictional forces created between these various members are very great. As there are four coil springs 80 for each guide wheel 34 and axle 35, these frictional forces are multiplied four times. When guide wheels 34 are raised for highway operation, each coil spring 80 swings up into a position in which its longitudinal axis is in a horizontal plane, so no component of the force exerted by the compressed spring is exerted in a vertical direction. It has been found that the frictional forces referred to are large enough in the embodiment of this invention just mentioned to hold the guide wheels in their elevated positions during all ordinary conditions of highway use.

In the embodiment shown and described, the hydraulic ram control valve is adapted to cut the steering booster cylinder off from the hydraulic pump whenever fluid pressure is applied to the hydraulic rams. If desired, however, the valve could be so constructed that pressure could be applied to both the booster cylinder and the hydraulic rams at one and the same time.

The above detailed description of this invention is given for clearness of understanding only. No unnecessary limitations should be understood therefrom, as modifications will be obvious for those skilled in the art.

We claim:

1. A guide wheel assembly for converting a highway vehicle of the type having a chassis frame supported from load-bearing wheels into a vehicle adapted for use both on the highway and on any railway having tracks spaced at substantially the same distance apart as the load bearing wheels of said vehicle which comprises: a guide wheel having a riding surface rollable along said tracks and provided with a radially extending flange; an individual axle for the guide wheel; supporting structure mounted on the chassis frame of said vehicle and supporting said axle for movement relative to said frame between predetermined raised and lowered positions, said supporting structure including spring means reacting against said chassis frame and said axle to urge said axle generally downwardly, said spring means being extensible from a compressed condition wherein said guide wheel is raised a predetermined distance above the ground and a normal free length condition wherein the guide wheel is lowered into rolling contact with the railway track for establishing simultaneous rolling engagement on the track of said guide wheel and said one load-bearing wheel; a hydraulic ram attached at its lower end to the guide wheel axle and adapted to be attached at its upper end to said chassis frame and movable for compressing and extending said spring means; and control means for the ram selectively actuatable for raising the guide wheel said predetermined distance or for lowering it to rail contact position.

2. The guide wheel assembly of claim 1 in which said spring means includes a first trunnion adapted to be attached to the chassis frame forward of the desired location of the guide wheel axle; a second trunnion adapted to be attached to the frame rearward of the desired location of the guide wheel; and a set of four heavy coil springs for adjustably attaching said axle to the chassis frame, each spring being rotatably attached at its lower end to the guide wheel axle, two rotatably attached at their upper ends to said first trunnion and two to said second trunnion, said set of springs upon installation and compression thereof being swingable upwardly about the respective trunnions and upon extension thereof being swingable downwardly about said trunnions.

3. The guide wheel assembly of claim 2 adapted for attachment near the rear end of the chassis frame of a vehicle having leaf springs for suspension of its rear end in which the innermost end of said first trunnion extends inward beyond the chassis frame and receives in rotatable attachment the upper end of one of said heavy coil springs, said guide wheel axle also extending inward of the chassis frame to receive in rotatable attachment the lower end of said one heavy coil spring, so that when said guide wheel assembly is attached to the chassis frame there is sufficient clearance for the rear leaf spring of the vehicle.

4. A guide wheel assembly for converting a highway vehicle of the type having a chassis frame supported from load-bearing wheels into a vehicle adapted for use both on the highway and on any railway having tracks spaced at substantially the same distance apart as the load bearing wheels of said vehicle which comprises: a guide wheel having a riding surface rollable along said tracks and provided with a radially extending flange; an individual axle for the guide wheel; supporting structure mounted on the chassis frame of said vehicle and supporting said axle for movement relative to said frame between predetermined raised and lowered positions, said supporting structure including spring means reacting against said chassis frame and said axle to urge said axle generally downwardly, said spring means being extensible from a compressed condition wherein said guide wheel is raised a predetermined distance above the ground to a normal free length condition wherein the guide wheel is lowered into rolling contact with the track for establishing simultaneous rolling engagement on the track of said guide wheel and said one load-bearing wheel; and elevating means connected between the guide wheel axle and the chassis frame and selectively movable for compressing or extending said spring means to raise said guide wheel said predetermined distance or to lower said guide wheel into rolling contact with said track.

5. In combination with a highway vehicle having a chassis frame resiliently supported on load-bearing wheels; means for converting said vehicle for use on a railway having rails spaced apart laterally a distance corresponding to the lateral spacing of the load-bearing wheels and comprising four flanged guide wheels rotatably mounted on four separate axles, intermediate supporting structure suspending said axles entirely from said chassis frame, said guide wheels being arranged in front and rear pairs adapted for rolling contact with the running surfaces of said rails and for simultaneous flanging engagement against opposed side surfaces of said rails to maintain each pair centered relative to said rails, said supporting structure mounting each guide wheel against lateral movement relative to said chassis frame and including downwardly acting spring-like means reacting between each axle and the chassis frame and operative over a predetermined vertical range to urge said axles into an in-use position wherein said guide wheels are in rolling contact with said rails at the time said load-bearing wheels are riding on said rails such that said guide wheels maintain said chassis frame centered with respect to said rails, and elevating means connected between each axle and the chassis frame for selectively moving said guide wheels between an out-of-the-way position such that said vehicle may be used on the highway and an in-use position such that said vehicle may be used on a railway.

6. The invention of claim 5 and wherein said supporting structure for each guide wheel includes a first trunnion attached to the chassis frame forwardly of the guide wheel and a second trunnion attached to the chassis frame rearwardly of the guide wheel, a set of coil springs rotatably connected at their lower ends to the guide wheel axle and rotatably attached at their upper ends to said trunnions, each set of springs, upon compression thereof, being swingable upwardly by said elevating means about their respective trunnions to raise said guide wheel a predetermined distance above the ground and upon extension thereof being swingable downwardly by said elevating means to lower the guide wheel into yieldable rolling contact with the rail.

7. A vehicle for use either on highways or on railways having track rails of predetermined gauge, said vehicle comprising a chassis frame, four load-bearing wheels arranged in a set of two at the front and a set of two at the rear of said frame, means for resiliently suspending said frame from said wheels with the wheels of each set being spaced apart laterally from one another a distance generally corresponding to the gauge spacing of said rails, four axle and flange wheel assemblies, means for mounting said assemblies from said chassis frame with two assemblies being positioned at the front and on opposite sides of the frame and two assemblies being positioned at the rear and on opposite sides of the frame, said mounting means including means for mounting each of said assemblies for movement relative to said frame between a lower position wherein the flange wheel thereof is located in rolling, flanging engagement with a rail when the load-bearing wheels are riding on the rails and an upper position wherein the flange wheel is elevated above the riding surface of the load-bearing wheels, said mounting means also including means for mounting each flange wheel assembly against lateral shifting movement relative to said chassis frame, means for yieldably and independently biasing each flange wheel downwardly to its said lower position and means for raising each flange wheel to its said upper position.

8. The arrangement of claim 7 wherein said raising means comprises a separate hydraulic ram unit for each flange wheel with each ram unit having relatively vertically movable members connected, respectively, to the chassis frame and the corresponding flange wheel axle, and a common source of hydraulic power connected to said ram units and including a selectively operable control valve for raising or lowering all of said flange wheels simultaneously.

9. A vehicle for use both on highways and on railways that have track rails of predetermined gauge, said vehicle comprising a chassis frame, front and rear pairs of load-bearing wheels, and a resilient suspension mounting said frame on said wheels with the wheels of each pair being spaced apart laterally a distance generally corresponding to the gauge of said rails, a separate flange wheel for each load-bearing wheel, a separate axle for each flange wheel, mounting structure for suspending each axle from said chassis frame to position the flange wheel thereof for independent rolling, flanging engagement with a rail when the load-bearing wheels are riding on the rails, said mounting structure including means for mounting each flange wheel against lateral shifting movement relative to said chassis frame, means for yieldably and independently biasing each flange wheel downwardly into rolling, flanging engagement with the rail, and means for raising said flange wheels relative to said frame to convert said vehicle for highway use.

10. The combination with a highway vehicle having a chassis frame, four load-bearing wheels for said frame and arranged in a set of two at the front and a set of two at the rear of said frame, and means for resiliently suspending said frame from said wheels with the wheels of each set being spaced apart laterally a distance corresponding to the gauge spacing of track rails; of means for converting said vehicle for use on track rails and comprising four axle and flange wheel assemblies, means for mounting said assemblies from said chassis frame with two assemblies being positioned at the front and on opposite sides of the frame and two assemblies being positioned at the rear and on opposite sides of the frame, said mounting means including means for mounting each of said assemblies for movement relative to said frame between a lower position wherein the flange wheel thereof is located in rolling, flanging engagement with a rail when the load-bearing wheels are riding on the rails and an upper position wherein the flange wheel is elevated above the riding surface of the load-bearing wheels, said mounting means also including means for mounting each flange wheel assembly against lateral shifting movement relative to said chassis frame, means for yieldably and independently biasing each flange wheel downwardly to its said lower position, and a hydraulic circuit on said chassis frame and connected to actuate all of said assemblies simultaneously, said circuit including a control valve selectively operable either for simultaneously raising all of said assemblies to their upper position or for simultaneously lowering all of said assemblies to their lower position.

References Cited in the file of this patent
UNITED STATES PATENTS

| | | |
|---|---|---|
| 35,244 | Nair | May 13, 1862 |
| 455,842 | Smith et al. | July 14, 1891 |
| 492,230 | Price | Feb. 21, 1893 |
| 1,169,402 | Holt | Jan. 25, 1916 |
| 1,446,784 | Carter | Feb. 27, 1923 |
| 1,750,599 | Holmes et al. | May 11, 1930 |
| 1,937,532 | Ronk | Dec. 5, 1933 |
| 1,973,494 | McCullough et al. | Sept. 11, 1934 |
| 2,577,830 | Watts et al. | Dec. 11, 1951 |
| 2,655,872 | Templeton | Oct. 20, 1953 |
| 2,655,873 | McDonald | Oct. 20, 1953 |